United States Patent [19]

Riew et al.

[11] 3,864,288

[45] Feb. 4, 1975

[54] QUATERNIZED POLYEPIHALOHYDRIN THICKENING AGENT

[75] Inventors: Chang Kiu Riew, Akron; Robert K. Schlatzer, Jr., Chagrin Falls, both of Ohio

[73] Assignee: The B. F. Goodrich Company, New York, N.Y.

[22] Filed: Oct. 15, 1973

[21] Appl. No.: 406,234

[52] U.S. Cl.............. 260/2 A, 156/330, 260/2 BP, 260/29.2 EP, 260/29.6 H, 260/29.6 AT
[51] Int. Cl...................... C08g 23/20, C08g 25/00
[58] Field of Search........... 260/2 A, 2 BP, 29.2 EP, 260/567.6 P, 297 R, 268 PL

[56] References Cited
UNITED STATES PATENTS

| | | | |
|---|---|---|---|
| 3,320,317 | 5/1967 | Rogers | 260/567.6 |
| 3,607,792 | 9/1971 | Speranza | 260/2 A |
| 3,625,684 | 12/1971 | Poot et al. | 96/1.5 |
| 3,640,766 | 2/1972 | Jursich et al. | 117/218 |

*Primary Examiner*—Harold D. Anderson
*Assistant Examiner*—E. A. Nielsen
*Attorney, Agent, or Firm*—J. Hughes Powell, Jr.

[57] ABSTRACT

Epihalohydrin polymers of high molecular weight are both lightly crosslinked by reaction with a polyamine and quaternized by reaction with a tertiary monoamine. The polymers are excellent thickening agents for water.

10 Claims, No Drawings

QUATERNIZED POLYEPIHALOHYDRIN THICKENING AGENT

BACKGROUND OF THE INVENTION

Epihalohydrin polymers, particularly pichlorohydrin polymers, are known to react with tertiary amines to yield quaternary ammonium salt adducts of the polymer (see U.S. Pat. Nos. 2,483,749; 3,320,317; 3,428,680; 3,594,355, and 3,640,766 and German Pat. No. 2,031,622). These quaternized polymers are employed as flocculating agents, electrophotographic materials, anti-bacterial agents, and paper and non-woven fabric additives. The polymers can also be used as thickening agents. However, their thickening efficiency, i.e., the amount of material needed to produce a high degree of thickening, is low and inferior to that of known agents such as sodium alginate, carboxymethyl cellulose, and particularly the polyacrylic acid salts. Because of their low thickening efficiency, quaternized polyepihalohydrin polymers are not used as thickening agents.

SUMMARY OF THE INVENTION

Epihalohydrin polymers, particularly epichlorohydrin polymers, of high molecular weight (above 100,000), are both lightly crosslinked by reaction with a polyamine and quaternized by reaction with a tertiary monoamine. The lightly crosslinked, quaternized epihalohydrin polymers are excellent thickening agents, having a thickening efficiency far superior to that of sodium alginate, carboxymethyl cellulose, and the like.

DETAILED DESCRIPTION

Epihalohydrin polymers of molecular weight above about 100,000 are lightly crosslinked by reaction with a polyamine and then quaternized by reaction with a tertiary monoamine. The epihalohydrin polymer can be an epihalohydrin homopolymer, a copolymer of two or more epihalohydrin monomers, or a copolymer of an epihalohydrin monomer(s) with an oxide monomer(s).

The epihalohydrin monomers have the formula

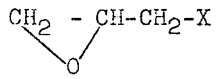

where X is Cl, Br, I or F. More preferredly, X is selected from Cl and Br. From a cost and availability standpoint, the preferred monomer is epichlorohydrin. Other halogen-bearing epoxide monomers can be used in partial replacement of the epihalohydrin monomer(s). Examples of these monomers are 4-chloro-1,2-epoxy butane, 4-bromo-1,2-epoxy butane, 1-(1,3-dichloroisopropoxy)-2,3-epoxypropane, 4,4,4-trichloro-1,2-epoxy butane, 1-bromoethyl glycidyl ether, 1,1,1-trichloroethyl glycidyl ether, 1,1,1-trifluoroethyl glycidyl ether, 1,2-epoxy-2-methyl-4,6,6,6-tetrachlorohexane, 1,2-epoxy-4-oxo-8,8,8-trichlorooctane, and the like.

The oxide monomers contain a cyclic oxy

ring therein. Examples of these monomers are alkylene oxides such as ethylene oxide, propylene oxide, butylene oxide, isobutylene oxide, octylene oxide, and the like; cycloaliphatic oxides such as cyclohexene oxide, vinyl cyclohexene oxide, and the like; glycidyl ethers such as methyl glycidyl ether, ethyl glycidyl ether, isopropyl glycidyl ether, n-hexyl glycidyl ether, phenyl glycidyl ether, and the like; glycidyl acrylate anad glycidyl methacrylate; allyl glycidyl ether; styrene oxide; and 4- and 5-membered oxy ring compounds such as furan and methyl substituted furan, and the like. Of the oxide monomers, the alkylene oxides containing two to about eight carbon atoms are preferred. Copolymers of epihalohydrin monomer(s) and alkylene oxide monomer(s) are readily available.

Examples of more preferred epihalohydrin polymers are polyepichlorohydrin, polyepibromohydrin, epichlorohydrin-epibromohydrin copolymer, epichlorohydrinethylene oxide copolymer, epibromohydrinethylene oxide copolymer, epichlorohydrin-propylene oxide copolymer, and epichlorohydrin-ethylene oxide-propylene oxide terpolymer.

Copolymers of epihalohydrin monomers and oxide monomers comprise at least 50% to 100% by weight (i.e., homopolymers) of polymerized units of epihalohydrin monomer(s), and up to 50% by weight of polymerized units of an oxide monomer(s). Preferredly, the polymers contain from about 65% to 100% by weight of polymerized epihalohydrin monomer(s). Excellent results are obtained using epichlorohydrin-ethylene oxide copolymers or, particularly, epichlorohydrin homopolymer.

The epihalohydrin polymer is lightly crosslinked by reaction with a polyamine. By polyamine is meant di-, tri-, and higher enumerated amines. The polyamine is used at a level from about 0.0005 mole to about 0.07 mole of amine per mole equivalent of halogen present, and preferably, at 0.001 mole to about 0.05 mole per mole equivalent of halogen in the polymer. The polyamines can be aliphatic, heterocyclic, aromatic, or alicyclic amines. Examples of the aliphatic polyamines are alkylenepolyamines such as ethylenediamine, trimethylenediamine, isobutylenediamine, 1,6-hexanediamine, triethylene tetraamine, tetraethylene triamine, and the like; N,N'-dimethyl ethylenediamine, 1,2-diaminopropane, 2,3-diaminobutane, N-methyl-N,N-bis(-2-aminoethyl)amine, and the like. Examples of heterocyclic polyamines are piperazine, homopiperazine, aminoethylpiperazine, N,N-bis(3-aminopropyl)-piperazine, N,N-dimethylpiperazine, 4-methylaminopyridine, diazabicyclo(2,2,2)octane, and the like. Examples of aromatic polyamines are m-phenylenediamine, 0-aminobenzylamine, 4,4'-diaminobiphenyl, 4,4'-diaminodiphenylmethane, and the like; and examples of alicyclic polyamines are 1,4-diaminocyclohexane, cis-1,4-diaminomethylcyclohexane, and the like.

At least four factors enter into the choice of a particular crosslinking polyamine, i.e., steric hinderance, a linear versus ring structure, electron-rich nature of the amine, and aliphatic versus aromatic nature of the amine. Each of these factors effect the ease and completeness of the crosslinking reaction.

The most important factor is steric hinderance. Amines having little or no bulky hindering groups on or adjacent to the amino nitrogen atom are preferred. Groups one carbon atom or more in size, like methyl, ethyl or propyl radicals and the like, are considered bulky groups. For example, a preferred order among the following three compounds would be piperazine->N,N-dimethyl-piperazine>N,N-diethyl-piperazine.

A second factor is the structure of the amine. An amine having a nitrogen atom in a ring structure is preferred to an amine having a nitrogen atom in a linear structure. For example, piperazine having two-ring atom nitrogens is more preferred than a linear diamine like 1,6-hexanediamine.

A third factor is the electron-rich nature of the nitrogen atom(s). All other factors being equal, the electronrich nature of amines is as tertiary>secondary>primary amines. An amine having a high electron-rich nature is preferred.

The fourth factor is the aliphatic versus aromatic nature of the amine. An amine has an aromatic nature when it has the amino nitrogen atom attached to a benzene ring (as in aniline or m-phenylene diamine) or when the nitrogen atom is present in a ring which is totally conjugated (as in pyridine or pyrazine). Conversely, if the amino nitrogen atom is attached to at least a methylene group (as in benzyl amine or xylenediamine) or the ring is not totally conjugated (as in piperazine or pyrroline), the amine has an aliphatic nature. Amines having an aliphatic nature are preferred.

All four factors can be present in any one amine so that a preferred factor(s) in one instance can be nullified by a non-preferred factor(s). For example, although N,N-dimethyl piperazine is a tertiary amine thereby theoretically having a higher electron-rich nature than piperazine, a secondary amine, the methyl groups on the nitrogen atom amino groups of the compound hinder its reactivity and the use of piperazine, which is not hindered, yields a superior crosslinked product. Although N,N-dimethylpiperazine has both a higher electron-rich nature and is an amine having a ring atom nitrogen structure as compared to 1,6-hexanediamine, which is of linear structure and has primary amino groups, results from using each of these compounds are similar. This is attributed to the steric hinderance on the N-methyl nitrogen atoms of the N,N-dimethylpiperazine. Further considerations arise when the polyamine can have a combination of primary, secondary, and tertiary amino structures. For example, triethylenetetraamine has both primary and secondary amino structures, N,N-bis(3-aminopropyl)piperazine has both primary and tertiary amino structures, and 4-methylaminopyridine has both secondary and tertiary amino structures.

As stated above, steric hinderance appears to be the single most important factor to consider in the choice of a polyamine to achieve the most efficient crosslinking. When the amine has no bulky groups on or adjacent to the amino nitrogen atom, factors such as higher electron-rich nature, an aliphatic nature, and a ring atom nitrogen structure should be selected to optimize the reaction product.

The crosslinking reaction can be conducted in bulk, but is more preferredly conducted in an aprotic solvent such as dimethylformamide, tetrahydrofuran, and the like. Reaction temperature ranges from about 50° C. to about 120° C. Reaction time is from about 2 hours to about 20 hours. A time of about 16 hours at 90° C. provides a satisfactory degree of crosslinking.

The lightly crosslinked epihalohydrin polymer is then quaternized by reaction with a tertiary monoamine. The tertiary monoamine is used at a level of from about 1 mole to about 5 moles of amine per 1 mole equivalent of halogen as originally present on the polymer. A level of about 2 moles per mole equivalent of halogen provides good results. Use of over about 5 moles of amino nitrogen per mole equivalent of halogen is not necessary to achieve satisfactory quaternization of the polymer.

The quaternization reaction temperature ranges from about 50° C. to about 120° C. Reaction time is from about 2 hours to about 48 hours. The reaction can be conducted in bulk, using an excess of the tertiary monoamine, or in an aprotic solvent such as dimethylformamide or tetrahydrofuran. If the reaction is conducted in bulk, up to 25 moles and over of tertiary monoamine to one mole equivalent of halogen can be used. Shorter reaction times are obtained if the reaction is performed as a bulk process using an excess of tertiary monoamine.

The tertiary monoamines can be aliphatic, heterocyclic, aromatic, or alicyclic monoamines. The monofunctional tertiary aliphatic amines have the formula NRRR' wherein R is methyl or ethyl and R' is the same as R or is a hydroxyethyl radical. Examples of these are trimethyl amine, triethyl amine, dimethylethyl amine, dimethyl hydroxyethyl amine, and the like. Examples of the saturated heterocyclic monoamines are N-methyl piperidine, N-ethyl piperidine, N-methyl hexamethyleneamine, N-methyl pyrrolidine, N-methylmorpholine, and the like. Examples of monofunctional unsaturated heterocyclic amines are pyridine, 4-methylpicoline, quinoline, N-methyl pyrrole, and the like. Examples of alicyclic tertiary amines are N,N-dimethyl cyclohexylamine and the like, and of aromatic monoamines N,N-dimethyl aniline, N,N-diethyl aniline, and the like. The more preferred tertiary amines are the aliphatic tertiary monoamines and saturated heterocyclic tertiary monoamines.

The lightly crosslinked polyepihalohydrin polymer must have at least 10% and, more preferredly, at least about 50% of the halogen groups present reacted with a tertiary monoamine to form a quaternary salt structure. Optimum results are obtained when over 90% of the halogen groups present are quaternized with a tertiary monoamine.

Simultaneous reaction of both the crosslinking polyamine and the quaternizing tertiary monoamine can be conducted if the polyamine has a total neuclophilicity equal to or above that of the tertiary monoamine. As this is often not the case, the quaternization should be performed after the crosslinking reaction, as the more neuclophilic tertiary monoamine will tie up all of the available halogen groups (if present in sufficient amount) and hinder or prevent the crosslinking reaction.

The prepared crosslinked, quaternized epihalohydrin polymer is often insoluble in the reaction solvents and precipitates out upon formation. If in remains in solution, the polymer can be isolated by direct drying or by coagulation using acetone. The polymer is usually washed using acetone to purify it and then dried by heating under a vacuum. The material is hygroscopic, and should be stored free from moisture.

The lightly crosslinked, quaternized epihaloydrin polymer is an excellent cationic thickening agent. In this use, it is employed at from about 0.05% to about 5%, and more preferredly at from about 0.1% to about 3% by weight per 100 parts by weight of water or solvent. The mucilages prepared have good stability and do not support growth of fungi or bacteria. Typically, the mucilages are smooth and transparent. The effective pH range of the mucilage is from about 4 to about 12.

The viscosity of the prepared mucilage varies as to the concentration of the polymer in the water (or solvent), the type and level of both the crosslinking diamine and the quaternizing tertiary diamine, the composition of the polyepihalohydrin polymer used, and other factors such as temperature, the presence of ions in the water, and the like. However, mucilages having viscosities (at a concentration of 1% by weight) of over 500 centipoise, and up to and over 50,000 centipoise at 25° C. are readily prepared. Total obtainable viscosity range is from about 50 centipoise to about 250,000 centipoise, measured at 27° C. at 20 rpm. Mucilage viscosity is measured using a Brookfield Model RVT Viscometer operating at a temperature of 25° C. (at 23° C. or 27° C. where indicated) using spindle No. 5 (spindle Nos. 6 and 7 used where indicated. at 20 rpm (other rpm velocities where indicated).

Many types of additive ingredients can be employed with the novel thickening agent. Additives such as pigments and colorants, fillers such as silicas, carbonates, and the like, polymeric resins, plasticizers, perfumes and fragrances, fungicidal and bactericidal agents, and the like, can be used. The crosslinked quaternized polyepihalohydrins can be used to thicken latexes and paints including printing pastes and printing inks, prepare solvent gels such as cleansing gels, paint and varnish strippers, and the like, to prepare hair groom products like shampoos and hair formulations, in preparing toothpastes, and in a multitude of products which are conveniently and/or aesthetically sold in thickened, gelled, paste, or semi-solid form.

The prepared mucilages have excellent yield values, i.e., initial resistance to flow until a minimum shear stress is applied. This property makes the mucilages useful for suspending solid objects (or for holding down light objects) in water or solvent. The thickened or gelled state can be broken by the addition of salts such as sodium and calcium chloride or a strong acid or base such as hydrochloric acid or sodium hydroxide.

Although the crosslinked, quaternized epihalohydrin polymer is particularly useful as a thickening agent, other uses such as flocculant for waste water, as an electroconductive coating for paper, and as an antistatic agent, are demonstrable.

The following examples serve to more fully illustrate the invention.

EXAMPLE I

A polyepichlorohydrin of high molecular weight having a raw polymer Mooney (ML-4 at 212° F.) viscosity of 56 and a chlorine content of 37% by weight, was employed.

Crosslinking Reaction

The polyepichlorohydrin (50 grams) was placed into a reactor vessel containing 400 milliliters of dimethylformamide. The vessel was flushed with nitrogen gas, sealed, and agitated for 2 hours at 90° C. to obtain a smooth solution of the polymer. Piperazine hexahydrate (0.5 grams) was dissolved in 35 milliliters of dimethylformamide and then injected into the polyepichlorohydrin solution. The reaction mixture was agitated for 16 hours at 90° C. and then cooled to about 0° C. The piperazine hydrate was used at 1 part by weight per 100 parts by weight of polymer, or at 0.005 mole of piperazine per 1.08 mole equivalent of chlorine, about a 0.005 mole to 1 mole ratio.

Quaternizing Reaction

Trimethylamine (35 grams) was dissolved in 65 milliliters of dimethylformamide, and then injected into the crosslinked epichlorohydrin solution prepared above. The reactor solution was agitated for 48 hours at 90° C. and then cooled to room temperature. The product had precipitated from solution. The dimethylformamide was drained off, and the product removed, cut into small pieces and washed with 500 milliliters of acetone. After drying at 50° C. under a vacuum, about 85 grams of product was recovered, indicating almost total reaction of the piperazine and trimethylamine with the polymer. The product is effectively 100% quaternized. The trimethylamine was used at 70 parts by weight per 100 parts by weight of polymer, or at 1.19 mole of trimethylamine per 1.08 mole equivalents of chlorine as originally present, about a 1 to 1 molar ratio.

The crosslinked quaternized epichlorohydrin polymer is a hard solid which is readily ground into a light colored powder. The polymer is hygroscopic, and should be stored free from moisture. A sample of the material absorbed about 10% by weight of moisture from air at 45% relative humidity in 5 hours. In 24 hours, the moisture pickup was about 11% by weight.

EXAMPLE II

The crosslinked, quaternized epichlorohydrin polymer prepared in Example I was evaluated as a thickening agent for water. The polymer, in powder form, was added in small portions to the water while agitating it using a marine-blade stirrer at high rpm. Ultra-high shear mixing can cause chain fracture and permanent viscosity loss. Various levels of the polymer in water were evaluated.

| | Wt.% Polymer in Water | Spindle Number | Visc., Centipoise 27°C. at 20 rpm |
|---|---|---|---|
| 1 | 0.2 | 5 | 6,900 |
| 2 | 0.5 | 6 | 20,500 |
| 3 | 1.0 | 7 | 37,000 |
| 4 | 3.0 | 7 | 90,000 |
| 5 | 5.0 | 7 | 124,000 |

The data shows that excellent thickening is achieved, even at low levels of the novel polymer. All of the mucilages were transparent and colorless.

For comparison, water mucilages were prepared using known thickening agents and techniques known to the art. The viscosity measurements were made at 27° C. at 20 rpm using spindle No. 5 on 1% by weight concentrations of agent in water.

| Material | Centipose |
|---|---|
| Gum Tragacanth | 300 |
| Sodium Alginate | 2,000 |
| Carboxymethyl Cellulose | 3,000 |

The data shows that the use of the novel polymers of this invention yields water mucilages having viscosities far superior to other known thickening agents. The mucilage viscosity is comparable to that obtained using the known anionic polyacrylic acid thickening agents.

EXAMPLE III

The polymer of Example I was used to prepare water mucilages at 1.0% by weight in water. The pH of the mucilages was adjusted by adding either hydrochloric acid or sodium hydroxide to the mix. In this manner, the effect of pH on viscosity was observed. pH of the mucilages was measured prior to each viscosity reading using a Beckman Zeromatic pH Meter. Measurements were at 25° C. at 20 rpm.

| Sample | pH   | Viscosity, centipoise | Spindle No. |
|--------|------|----------------------|-------------|
| 1      | 2.5  | Solution             | 5           |
| 2      | 3    | 10,000               | 5           |
| 3      | 3.6  | 20,800               | 6           |
| 4      | 4.5  | 47,500               | 7           |
| 5      | 7.0  | 52,000               | 7           |
| 6      | 10.8 | 52,000               | 7           |
| 7      | 12   | 32,000               | —           |
| 8      | 12.5 | Coacervated          |             |

The example demonstrates the utility of the novel polymers over a wide pH range. From a pH of about 5 to about 11, a relatively uniform mucilage viscosity is obtained.

EXAMPLE IV

Similar to other thickening agents, the polymers of this invention prepare mucilages exhibiting a yield value. The yield value is an initial resistance to flow until a minimum shear stress is reached. It is measured herein by preparing a mucilage and recording dial readings from a Brookfield Viscometer at 0.5, 10, 20, 50 and 100 rpms using spindle No. 5 and then plotting the readings to obtain an extrapolated value at zero shear. The value obtained is a relative yield value.

| Material          | Concentration Percent | Relative Yield Value |
|-------------------|----------------------|----------------------|
| Gum Tragacanth    | 3.0                  | 1                    |
| Sodium Alginate   | 2.5                  | 5                    |
| Polyacrylic Acid  | 0.2                  | 15                   |
| Polymer of Example 1 | 0.2               | 16                   |

A high yield value allows for the suspension of large and/or heavy solids in the mucilage. The data shows the high yield value of the mucilages prepared with the novel polymers, even at low concentrations. A 0.5% by weight concentration of the polymer in water can support a one-forth inch steel ball bearing or hold down a standard ping-pong ball!

EXAMPLE V

The level or degree of crosslinking has an effect upon its performance as a thickening agent. Generally, at low levels of crosslinking, the prepared polymer exhibits improved thickening ability as the degree of crosslinking increases. This continues until the polymer starts to become over-crosslinked. Finally, the polymer becomes too tightly crosslinked to hydrate properly and ceases to adequately perform as a thickening agent.

The polymer used in Example I was crosslinked using piperazine hexahydrate at various levels of the diamine to the polymer. Conditions were 24 hours at 90° C. The polymers were then quaternized and evaluated as to their thickening ability. Procedures follow those given in Example I. The recipes used are:

|                              | A    | B     | C     | D     |
|------------------------------|------|-------|-------|-------|
| Polymer parts                | 100  | 100   | 100   | 100   |
| Mole equivalents of chlorine | 1.08 | 1.08  | 1.08  | 1.08  |
| Piperazine hexahydrate, parts| 0    | 1     | 3     | 4     |
| Moles of piperazine          | 0    | 0.005 | 0.016 | 0.021 |
| Trimethylamine, parts        | 70   | 70    | 70    | 70    |
| Moles                        | 1.19 | 1.19  | 1.19  | 1.19  |
| Dimethylformamide, Milliliters | 1000 |     |       |       |
| Mole ratio of diamine to polymer equiv. | 0 | 0.005 | 0.015 | 0.020 |

The polymer samples were isolated, dried, ground into powders, and added to water to form mucilages. Viscosity at two concentrations was measured (at 20 rpm at 23° C.).

| Sample | 0.5% Concentration | 1.0% Concentration | Spindle Number |
|--------|--------------------|--------------------|----------------|
| A      | 140                | 300                | 5              |
| B      | 22,000             | 51,000             | 7              |
| C      | 2,750              | 11,250             | 6              |
| D      | 750                | 7,500              | 6              |

The data shows that the crosslinked, quaternized epihalohydrin polymers of this invention (samples B to D) are much more efficient thickening agents than a polymer which is quaternized only (sample A).

In this experiment, using polyepichlorohydrin, piperazine hexahydrate and trimethylamine as the reactive ingredients, an optimum thickening efficiency is obtained at about 1 part by weight of the crosslinking polyamine.

EXAMPLE VI

The polyepichlorohydrin used in Example I was reacted with various levels of piperazine hexahydrate as the crosslinking polyamine and pyridine as the quaternizing tertiary amine. Both reactions were conducted simultaneously as a bulk process. The recipes are:

|                                          | A    | B     | C     | D     | E     |
|------------------------------------------|------|-------|-------|-------|-------|
| Polymer, parts                           | 100  | 100   | 100   | 100   | 100   |
| Mole equivalents                         | 1.08 | 1.08  | 1.08  | 1.08  | 1.08  |
| Piperazine hexahydrate, parts            | 0    | 0.5   | 0.75  | 1.0   | 1.5   |
| Moles of piperazine                      | 0    | 0.002 | 0.004 | 0.005 | 0.008 |
| Pyridine, parts                          | 1060 | 1060  | 1060  | 1060  | 1060  |
| Moles                                    | 13.4 | 13.4  | 13.4  | 13.4  | 13.4  |
| Mole ratio of diamine to polymer equivalents | 0 | 0.002 | 0.004 | 0.005 | 0.007 |

The mixing procedure followed that of Example I. Reaction conditions were 48 hours at 90° C. The sample products which had precipitated from solution were isolated, washed with acetone, and dried at about 60° C. under a vacuum. Weight measurements before and after the reaction indicated that from about 35% to 42% of the available chlorine on the polymer was reacted in each case. A repeat experiment of sample D at 1920 grams of pyridine per 100 grams of polymer yielded an amount of product indicating reaction of 54% of the available chlorine.

The polymer samples were mixed with water at a concentration of 2% by weight in water, and viscosity measurements taken (25°C., 20 rpm, spindle No. 5).

| Sample | Viscosity, Centipoise | Parts Piperazine Hydrate |
| --- | --- | --- |
| A | 33 | 0 |
| B | 53 | 0.5 |
| C | 80 | 0.75 |
| D | 520 | 1.0 |
| E | 1046 | 1.5 |

The data shows that samples B to E containing polymers lightly crosslinked with a diamine, have significantly higher mucilage viscosities than sample A which is quaternized only.

EXAMPLE VII

A polyepichlorohydrin similar to that used in Example I was crosslinked using various polyamines and then quaternized using trimethylamine. The reaction procedure followed that of Example I. The recipes are (in parts by weight and moles):

|  | 1 | 2 | 3 | 4 |
| --- | --- | --- | --- | --- |
| Polymer, parts | 100 | 100 | 100 | 100 |
| Mole equivalents of chlorine | 1.08 | 1.08 | 1.08 | 1.08 |
| 1,6-Hexanediamine, parts | 0.83 | — | — | — |
| Moles | 0.0072 | — | — | — |
| N,N-dimethyl piperazine, parts | — | 0.59 | — | — |
| Moles | — | 0.0051 | — | — |
| N,N-bis(3-aminopropyl)piperazine, parts | — | — | 1.03 | — |
| Moles | — | — | 0.0052 | — |
| 1,4-Diazobicyclo(2,2,2)Octane, parts | — | — | — | 0.53 |
| Moles | — | — | — | 0.0047 |
| Dimethylformamide, milliliters | 1010 | 1006 | 1003 | 973 |
| Trimethylamine, parts | 74.5 | 74.1 | 72.4 | 67.1 |
| Moles | 1.26 | 1.25 | 1.22 | 1.14 |
| Recovered weight, grams | 137.8 | 140.9 | 136.8 | 136.4 |
| Indicated % chlorine reacted | 50 | 55 | 50 | 54 |

The polymer was dissolved in about 800 grams of dimethylformamide. The polyamines were dissolved in about 70 grams of dimethylformamide, and the solution added to the polymer solution. The crosslinking reaction was conducted at 90° C. for 16 hours. The reactor mix was cooled to 0° C. and the trimethyl amine added as a solution at 36% by weight in dimethylformamide. The quaternizing reaction was conducted at 90° C. for 48 hours. The products had precipitated from solution, and the dimethylformamide was decanted off and the materials washed twice with 200 milliliters of acetone. The products were dried at 50°C. for 16 hours under a vacuum, to yield dry hard solids.

A 1 gram portion of each sample was admixed with 100 milliliters of water to prepare mucilage samples. Mixing procedure followed that of Example II. Viscosity of each mucilage was measured at 25° C. at 20 rpm using spindle No. 6. Data is as follows:

| Sample | Viscosity, centipoise |
| --- | --- |
| 1 | 16,650 |
| 2 | 18,750 |
| 3 | 99,800 |
| 4 | 384 |

In all cases, especially with samples 1, 2 and 3, a high mucilage viscosity was exhibited.

We claim:

1. A crosslinked, quaternized epihalohydrin polymer product prepared by the reaction of
   1. an epihalohydrin polymer of molecular weight above about 100,000 consisting of at least 50 percent to 100 percent by weight of polymerized units of an epihalohydrin monomer(s) of the formula

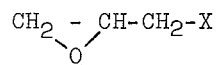

wherein X is Cl, Br, I, or F, and up to 50 percent by weight of polymerized units of an oxide monomer(s) selected from the group consisting of alkylene oxides, cycloaliphatic oxides, glycidyl ethers, glycidyl acrylate, glycidyl methacrylate, allyl glycidyl ether, styrene oxide, and furan, with
   2. from about 0.005 to about 0.07 mole of an aliphatic, heterocyclic, aromatic, or alicyclic polyamine, and
   3. from about 1 mole to about 5 moles of an aliphatic, heterocyclic, aromatic or alicyclic tertiary monoamine, said moles of polyamine and tertiary monoamine based upon 1 mole equivalent of halogen present on the epihalohydrin polymer.

2. A polymer product of claim 1 wherein the epihalohydrin polymer consists of at least 50 percent to 100 percent by weight of polymerized units of an epihalohydrin monomer(s) of the formula

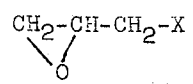

wherein X is Cl, Br, I or F, and up to 50 percent by weight of polymerized units of an alkylene oxide monomer(s) containing two to about eight carbon atoms, all weights based upon the weight of the epihalohydrin polymer.

3. A polymer product of claim 2 wherein the polyamine is selected from the group consisting of 1,6-hexanediamine, piperazine, N,N-dimethylpiperazine, and N,N-bis(3-aminopropyl) piperazine.

4. A polymer product of claim 2 wherein the polyamine is employed at from about 0.001 mole to about 0.05 mole per mole equivalent of halogen.

5. A polymer product of claim 4 wherein the tertiary monoamine has the formula NRRR' wherein R is a methyl or ethyl radical and R' is the same as R or is a hydroxyethyl radical.

6. A polymer product of claim 5 wherein the tertiary monoamine is trimethylamine.

7. A polymer product of claim 6 wherein (1) is an epichlorohydrin homopolymer.

8. A mucilage comprising
   a. water and
   b. from about 0.05 percent to about 5 percent by weight based upon the weight of the water of a crosslinked, quaternized epihalohydrin polymer product prepared by the reaction of
      1. an epihalohydrin polymer of molecular weight above about 100,000 consisting of at least 50 percent to 100 percent by weight of polymerized units of an epihalohydrin monomer(s) of the formula

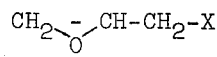

wherein X is Cl, Br, I, or F, and up to 50 percent by weight of polymerized units of an oxide monomer(s) selected from the group consisting of alkylene oxides, cycloaliphatic oxides, glycidyl ethers, glycidyl acrylate, glycidyl methacrylate, allyl glycidyl ether, styrene oxide, and furan, with 2. from about 0.005 to about 0.07 mole of an aliphatic, heterocyclic, aromatic, or alicyclic polyamine, and
   3. from about 1 mole to about 5 moles of an aliphatic, heterocyclic, aromatic or alicyclic tertiary monoamine, said moles of polyamine and tertiary monoamine based upon one mole equivalent of halogen present on the epihalohydrin polymer.

9. A mucilage of claim 8 wherein (2) is selected from the group consisting of 1,6-hexanediamine, piperazine, N,N-dimethylpiperazine, and N,N-bis(3-aminopropyl)-piperazine, and (3) is an aliphatic tertiary monoamine of the formula NRRR' wherein R is a methyl or ethyl radical and R' is the same as R or is a hydroxyethyl radical.

10. A mucilage of claim 9 wherein (1) is an epichlorohydrin homopolymer.

* * * * *